April 20, 1948.　　　R. BAUDERS　　　2,439,961
WAGON CHUTE
Filed March 29, 1946　　　2 Sheets-Sheet 1

INVENTOR.
RAY BAUDERS
BY

April 20, 1948. R. BAUDERS 2,439,961
WAGON CHUTE
Filed March 29, 1946 2 Sheets-Sheet 2

INVENTOR.
RAY BAUDERS
BY

Patented Apr. 20, 1948

2,439,961

UNITED STATES PATENT OFFICE 2,439,961

WAGON CHUTE

Ray Bauders, Kewanee, Ill.

Application March 29, 1946, Serial No. 658,267

4 Claims. (Cl. 193—5)

The present invention relates generally to conveyor chutes, and more particularly to a chute adapted to be attached to a vehicle.

Heretofore vehicle attached chutes, such for example as coal chutes on dump trucks, have usually been of an open trough type with no provision for any angular adjustment of the chute to one side or the other. Thus unless the truck can be backed up in substantially a direct line with the entrance opening for receiving the coal or other material that is being handled, the same must be dumped and then later shoveled into the entrance opening.

Accordingly, one object of the present invention is to provide a novel chute for attachment to a truck, dump truck or the like, whereby the same may be turned from the body of the truck for different angles of material discharge into entrance openings displaced to either side of the truck.

Another object is to provide a novel chute for attachment to the rear of a dump truck body comprising a plurality of telescopic sections arranged to be connected to the truck body by a swivel arrangement.

Still a further object is to provide in a novel coal chute specially adapted for connection to dump trucks, a novel swiveling elbow section interconnecting the back of the truck with a plurality of telescopic tubular sections, which form the main body of the chute, whereby the off-set of said elbow section from the rear of the dump truck body compensates for the tilt of the body during dumping and thus provides no interference with the proper positioning of the chute with respect to an entrance opening into which the material is to be discharged.

The above and further objects and novel features of the present invention will more fully appear from the following detailed description when the same is read in connection with the accompanying drawings.

Figure 1:
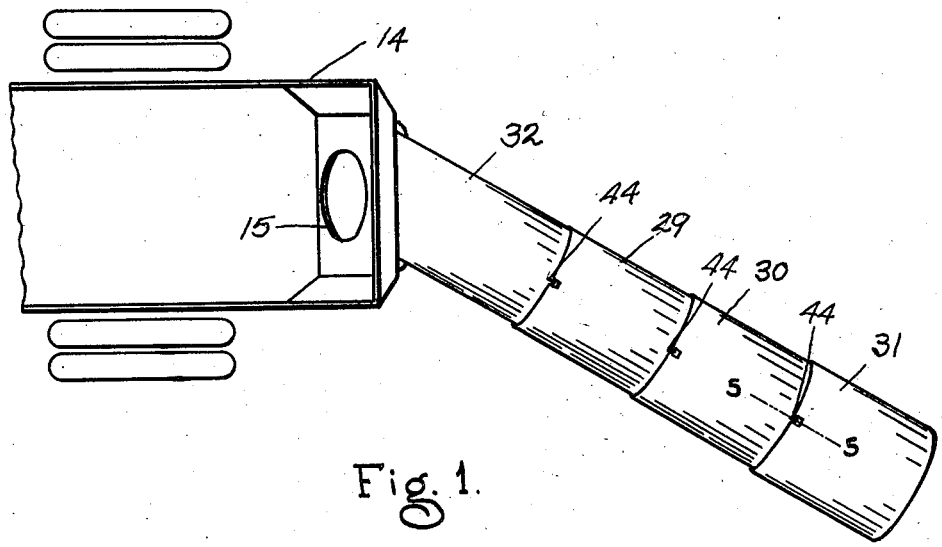
Figure 1 is a top plan view of the rear of a dump truck, showing the chute attached and swivelled to one side.
Figure 2:
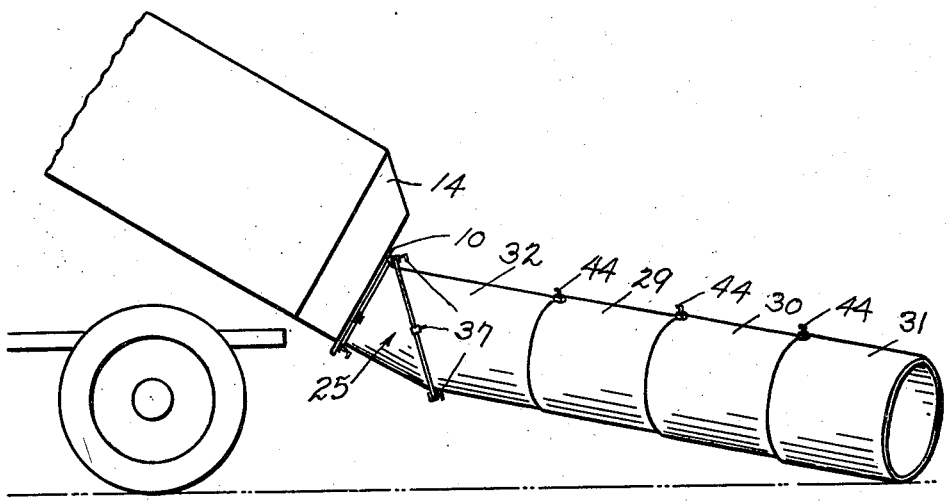
Figure 2 is a side view of the rear portion of a dump truck with the chute attached and showing the advantage of the novel elbow section of the chute.
Figure 3:
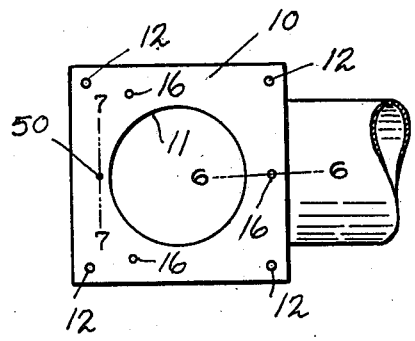
Figure 3 is a plan view of the swivel plate attachment for the rear dump opening in the truck body.
Figure 6:
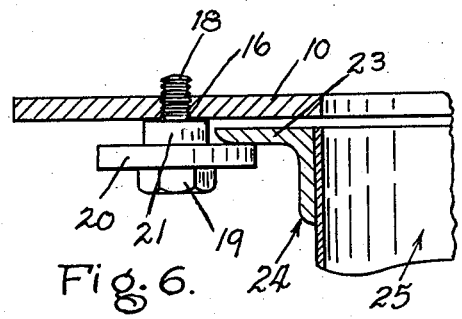
Figure 6 is a cross sectional view taken along line 6—6 of Figure 3.

Referring in detail to the drawings and first with particular reference to Figs. 2, 3 and 6, the chute in the embodiment illustrated comprises a truck attaching plate 10 having a central opening 11. The plate 10 may be any shape, such as the rectangular shape shown, and has an opening 12 in each of its four corners for attachment by bolts, not shown, to the rear of a truck body 14 having an opening 15, see Figure 1, in registry with the opening 11 in the plate 10.

The plate 10 has three threaded apertures 16 into which threadedly fit the ends of studs 18, see Figure 6. Each stud 18 has a hexagonal head 19 the under side of which is adapted to engage the flat face of a roller 20.

Integrally formed with the side of the roller 20 is an annulus or collar 21. This collar 21 has an internal bore slightly larger than the shank of the stud 18 on which the roller 20 may turn. When attached to the plate 10 the periphery of the roller 20 is spaced apart from the plate by the thickness of the collar 21. Into this space projects an annular flange 23, which is part of an angle member 24 secured around the end of a tubular body 25, as by sweating, soldering or welding the same thereon.

The tubular body 25 constitutes a part of an elbow section 28 to which a plurality of telescopically mounted tubular sections 29, 30 and 31 are secured, as hereinafter to be more fully described.

The novel elbow section 28 including its flange 23 is arranged to turn or swivel between the plate 10 and rollers 20; and this section 28 is made in two parts, namely 25 and a part 32.

These parts 25 and 32 have their ends rolled into flat rings or flanges 34 and 35, respectively. The flanges 34 and 35 are of the same width and diameter so as to make a complementary fit against each other, and are held together in face to face relation by U-clips 36. Each of these clips receives between the two sides or legs thereof, the edges of the two flanges 34 and 35.

Figure 4:
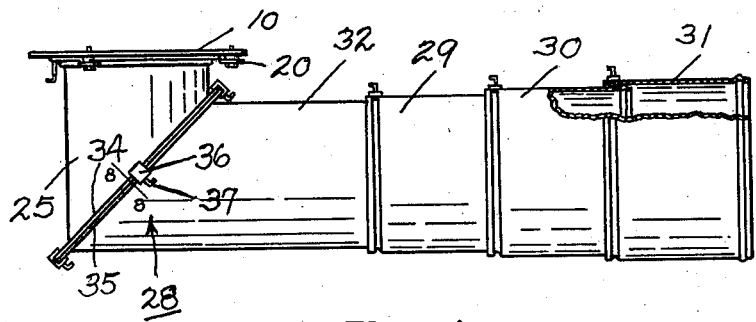
Figure 4 is a side view of the chute detached.

The U-clips 36 are secured to the flanges by bolts 37, see Fig. 4. One leg of each clip has a bolt 37 threaded therethrough so that each bolt only engages the face of one flange adjacent to this leg of the clip. Thus the sections or parts 25 and 32 of the elbow 28 are free to turn or swivel with respect to each other for any angular adjustment desired from the rear of the truck 14.

The first of the telescopic sections 29 is mounted around the part 32 of the elbow 28, and is larger in diameter for this purpose, while section 30 is of larger diameter than 29 and is mounted around the section 29. Also, the section 31 is similarly larger than section 30 and is mounted around section 30.

Thus the sections may telescope from the extended positions shown to a folded position on and around the part 32 of the elbow 28, if desired.

Near the open end of the part 32 within its bore, the part is pushed out to form an annular bead 40. The outer diameter of the bead 40 slides inside of the section 29 and is prevented from sliding back out of the end of section 29 by means of an annular bead 41 formed in the end of section 29, which is pushed in from the outer side of the section, so as to serve as a stop against which the bead 40 strikes when the sections are extended.

Each section 29—30 and 30—31 are similarly beaded as shown at 40 and 41, for cooperatively contacting each other in extended positions.

Figure 5:
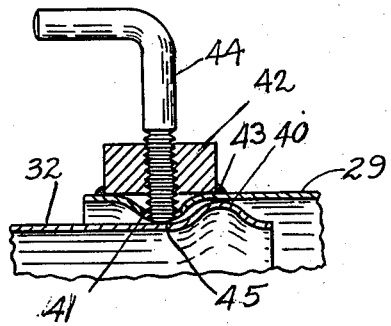
Figure 5 is a cross section taken along the line 5—5 of Figure 1 showing the means for locking the telescopic section in extended position.

In order to hold the telescopic sections in their extended positions during use of the chute to unload coal or the like, there is mounted across the valley defined from each bead 41 an internally threaded nut 42. The nut 42 may be soldered to the outer ends of each section as shown at 43, in Figure 5. Threadably adjustable through the nut 42 and a threaded aperture in the bead 41, is a set screw or L-headed bolt 44. Thus when the sections are extended the bolt 44 may be turned, so that its end 45 presses against the outer surface of the adjacent smaller inner section.

The general operation of the device should be apparent from the foregoing description; briefly reviewing the same, the plate 10 is bolted over the opening 15 in the end or tail gate of the dump truck 14. The truck is backed up as close as possible to an entrance opening, not shown, for receiving the material discharged from the truck through the chute. Assuming that the entrance opening is so placed that it is off to the side of the rear end of the truck, then section 25 and portion 32 may be turned until the telescopic section 29, 30 and 31 can be inserted toward and into the opening.

Figure 7:
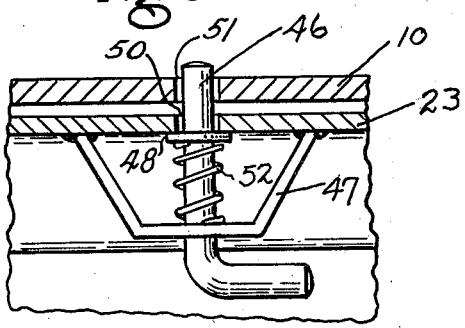
Figure 7 is a cross sectional view taken along line 7—7 of Fig. 3.
Figure 8:
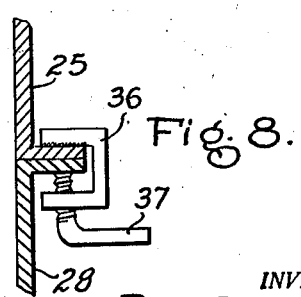
Figure 8 is a sectional view taken on an enlarged scale, on the line 8—8 of Figure 3.

Once that the last section 31 has been inserted in the entrance opening, then the elbow parts 25 and 32 may be locked to their present adjusted position by means of bolts 37; and the portion 25, which carries flange 23 may be latched against turning by an L-shaped bolt 46, see Fig. 7.

The bolt 46 is mounted in a bracket 47 soldered to the outer side of flange 23, and has a fixed washer 48 near its latch end adapted to limit the extent to which the bolt 46 penetrates through the respective aligned openings 50 and 51 in the flange 23 and the plate 10. The bolt 46 is normally forced into engagement within the openings 50 and 51 by a spring 52 coiled between the washer 48 and the bracket 47. Thus to adjust the entire chute, elbow and all, it is only necessary to pull on the L-head of the bolt 46 against the action of spring 52 to release it from connection with plate 10, whereupon the flange 23 is freely rotatable on the rollers 20.

Without further description the novel features and advantages of the present invention should be apparent and although one embodiment has been illustrated and described in detail, it is to be expressly understood that various changes in construction are intended to be included within the scope of the present invention. To determine the scope of the present invention reference should be had to the appended claims.

What I claim is:

1. A chute for attachment to vehicles comprising a plurality of telescopic sections, an elbow section connected to one of said sections and to the rear of the vehicle, said elbow comprising two parts angularly adjustable with respect to each other, to thereby permit the telescopic sections to be swung to either the left or right of the vehicle, releasable securing elements coupling the two elbow parts together for changing the angular relation of the parts, a plate secured to the rear wall of the dump vehicle, a flange carried by one part of said elbow, studs extending from the plate, and rollers journalled on said studs, said flange riding on said rollers for turning thereon, whereby the entire chute may be turned on this connection when said elbow parts are locked together by said securing elements.

2. A chute attachment for a vehicle having a wall provided with a discharge opening, comprising a centrally apertured plate member adapted to be secured to said wall over said discharge opening, a chute elbow having two angularly related sections, one of said sections having at one end an outstanding encircling track flange, the said end of the said one section being positioned concentric with the aperture of the plate, means carried by the plate providing a plurality of rollers encircling said flange whereby said pipe elbow may be rotated with respect to the apertured plate, means for coupling the flange to the apertured plate to secure the elbow against turning, and a pipe comprising a plurality of telescopically joined sections, an end of one of said sections being telescopically connected with the other section of the elbow.

3. A chute construction of the character stated in claim 2, wherein said roller means comprises headed studs secured to the apertured plate, a disk member rotatably mounted on the stud and between which and the adjacent apertured plate the said flange positions, and a spacer collar upon each stud and interposed between the apertured plate and the roller disk.

4. A chute construction of the character stated in claim 2, wherein each of said elbow sections carries an integral encircling flange, the flanges of the two elbow sections being in abutting relation, substantially U-shaped elements straddling the said flanges, and a binding screw carried by one side of each U-shaped element for engagement with the adjacent flange to effect the binding together of the two flanges.

RAY BAUDERS.

REFERENCES CITED

The following references are of record in the file of this patent:

UNITED STATES PATENTS

| Number | Name | Date |
|---|---|---|
| 160,861 | Adgate | Mar. 16, 1875 |
| 726,903 | Gibson | May 5, 1903 |
| 1,307,199 | Heyer | June 17, 1919 |
| 1,364,581 | Ramsey | Jan. 4, 1921 |
| 1,489,850 | Rogers | Apr. 8, 1924 |